(12) United States Patent
Park et al.

(10) Patent No.: US 7,018,687 B2
(45) Date of Patent: Mar. 28, 2006

(54) LIQUID CRYSTAL DISPLAY DEVICE

(75) Inventors: Su Hyun Park, Seoul-tukpyolshi (KR); Young Seok Choi, Daejon-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 30 days.

(21) Appl. No.: 10/390,767

(22) Filed: Mar. 19, 2003

(65) Prior Publication Data

US 2003/0180477 A1 Sep. 25, 2003

Related U.S. Application Data

(63) Continuation of application No. 10/103,842, filed on Mar. 25, 2002, now Pat. No. 6,582,784, which is a continuation of application No. 09/553,406, filed on Apr. 20, 2000, now Pat. No. 6,383,579.

(30) Foreign Application Priority Data

Apr. 21, 1999 (KR) ........................................ 1999-14122

(51) Int. Cl.
*C09K 19/56* (2006.01)
*G02F 1/13* (2006.01)

(52) U.S. Cl. .................... 428/1.2; 252/299.4; 349/128; 349/129; 349/130; 349/132; 349/135

(58) Field of Classification Search ............. 252/299.4; 428/1.2, 1.25, 1.26; 349/126, 129, 130, 132, 349/135
See application file for complete search history.

(56) References Cited

U.S. PATENT DOCUMENTS

| 6,383,579 B1 | * | 5/2002 | Park et al. | .................. 428/1.26 |
| 6,572,939 B1 | * | 6/2003 | Kwon et al. | .................. 428/1.2 |
| 6,582,784 B1 | * | 6/2003 | Park et al. | .................. 428/1.26 |

FOREIGN PATENT DOCUMENTS

| DE | 4420585 | 12/1995 |
| DE | 199 07 107 A1 | 9/1999 |
| JP | 57-136621 | 8/1982 |
| JP | 58137822 | 8/1983 |
| JP | 11-236451 | 7/2000 |
| WO | WO 98/08136 A | 2/1998 |

OTHER PUBLICATIONS

J. Chen, et al., Investigation of the Mechanism of the Surface–Induced Alignment of Liquid Crystals by Linearly Polymerized Photopolymers, Physics Department and Liquid Crystal Institute, Kent State University, Kent, OH, SID 95 Digest, pp. 528–531.
Takahiro Seki et al. "Photoregulation of Nematic Liquid Crystal Alignment By LB Films of Azobenzene/Polyethyoenimine Derivatives", vol. 267, 1995, pp. 429–434.
Preliminary Search Report, French Patent Office, May 7, 2004.

* cited by examiner

*Primary Examiner*—Shean C. Wu
(74) *Attorney, Agent, or Firm*—McKenna Long & Aldridge LLP

(57) ABSTRACT

The liquid crystal display device of the present invention comprises first and second substrates, a first alignment layer on the first substrate, wherein the first alignment layer includes polyethyleneimine, and a liquid crystal layer between the first and second substrates.

40 Claims, 1 Drawing Sheet

LIQUID CRYSTAL DISPLAY DEVICE

This application is a continuation of application Ser. No. 10/103,842 filed Mar. 25, 2002 which is a continuation of application Ser. No. 09/553,406, led Apr. 20, 2000, now U.S. Pat. No. 6,383,579, all of which are hereby incorporated by reference as if fully set forth herein.

BACKGROUND OF THE INVENTION

1. Field of the Invention

The present invention relates to a liquid crystal display device, and more particularly to a liquid crystal display device with an alignment layer including materials having a photosensitivity.

2. Description of the Related Art

It is generally known that a liquid crystal consists of anisotropic molecules. The average direction of the long axes of liquid crystal molecules is called the director of the liquid crystal. The director distribution in the liquid crystal is determined by the anchoring energy on a substrate, and is characterized by a director corresponding to a minimum of the surface energy of the liquid crystal and the anchoring energy. The director is rearranged by an electric field generated during operation of a liquid crystal display device (LCD). A LCD comprises two substrates opposed having liquid crystal therebetween.

In general, to obtain uniform brightness and a high contrast ratio, it is necessary to align the liquid crystal molecules uniformly in the liquid crystal cell. Several techniques have been proposed using polymers to obtain single or mono-domain homogeneous alignment of liquid crystal molecules. Particularly, it is known that polyimide or polysiloxane-based materials have high quality and good thermostability.

The most common technique employed as an alignment method to obtain a mono-domain liquid crystal cell involves forming microgrooves on the surface of the alignment polymer, which provides strong anchoring and stable alignment. In the above-mentioned technique, known as the rubbing method, a substrate coated with an alignment polymer is rubbed with a cloth. The rubbing method is a good method which can be applied to large scale LCDs, and thus is widely used in the industry.

The rubbing method, however, has several serious drawbacks. Because the shape of the microgrooves formed on the alignment layer depends on the rubbing cloth and rubbing intensity, the resulting alignment of the liquid crystal is often heterogeneous, causing phase distortion and light scattering. Further, an electrostatic discharge (ESD) generated by rubbing of the polymer surface further generates dust contamination in an active matrix LCD panel, decreasing production yield and damaging the substrate.

In order to solve these problems, a photo-alignment method has been proposed using a polarized ultraviolet light irradiated onto a photosensitive polymer to photo-polymerize the polymer (A. Dyadyusha, V. Kozenkov et al., *Ukr. Fiz. Zhurn.*, 36 (1991) 1059; W. M. Gibbons et al., *Nature*, 351 (1991) 49; M. Schadt et al., *Jpn. J. Appl. Phys.*, 31 (1992) 2155; T. Ya. Marusii & Yu. A. Reznikov, *Mol. Mat.*, 3 (1993) 161; EP 0525478; and U.S. Pat. No. 5,538,823—a polyvinyl-fluoro cinnamate patent). The alignment capability of the photosensitive polymer is determined by the anisotropy of the photosensitive polymer, which is induced by ultraviolet light irradiation.

In the photo-alignment method, an alignment layer is given an alignment direction by irradiating a substrate coated with a photo-alignment material with a linearly polarized UV light. The photo-alignment layer comprises a polyvinyl cinnamate-based (PVCN) polymer, and as linearly polarized UV light is irradiated, the polymer photo-polymerizes through cross-linking. Cross-linking is generated among the polymers by the UV light energy.

In terms of the direction of the photo-polymers, the alignment direction of the photo-alignment layer has a specific direction in relation to the polymerization direction of the linearly polarized UV light. The alignment direction of the photo-alignment layer is determined by the direction of the photo-polymers. The pretilt angle of the photo-alignment layer is determined by the incident direction and the irradiating energy of the irradiated UV light. That is to say, the pretilt angle direction and the pretilt angle of the photo-alignment layer are determined by the polarized direction and the irradiating energy of the irradiated UV light.

With regard to photo-alignment, a polarizer is rotated in an arbitrary angle on each domain of the LCD. Then, in response to irradiating UV light, the polarization direction is changed, whereby a multi-domain LCD cell is achieved with multiple domains having different alignment directions in relation to each other.

The photo-alignment method, however, has several drawbacks. For example, it is impossible to apply on a wide scope. Most importantly, low photosensitivity of the photo-alignment material results in reduction of anisotropy and thermostability.

UV light irradiation takes a long time using conventional techniques, from approximately 5 to as long as 10 minutes. Low photosensitivity and small anisotropy make the anchoring energy of the final photo-alignment layer weak. Moreover, when the liquid crystal is injected into the liquid crystal panel, it is required that the injection be made at a high temperature. Low thermostability induces a flowing effect on the substrates, which can be observed as a ripple pattern in the liquid crystal upon injection between the substrates. Finally, disclination owing to the non-uniform alignment of liquid crystals remains as a problem to be solved.

SUMMARY OF THE PREFERRED EMBODIMENTS

Accordingly, the present invention is directed to a LCD that substantially obviates one or more of the problems due to limitations and disadvantages of the related art.

An object of the present invention is to provide a liquid crystal display device with an alignment layer including Materials having good thermostability and photosensitivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof.

To achieve these and other advantages and in accordance with the purpose of the present invention, as embodied and broadly described herein, the liquid crystal display device of the present invention comprises first and second substrates, a first alignment layer on the first substrate, wherein the first alignment layer includes polyethyleneimine, and a liquid crystal layer between the first and second substrates.

The polyethyleneimine is

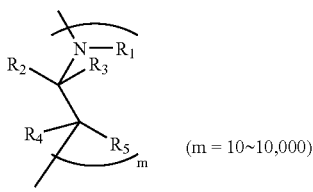

(R₁ is

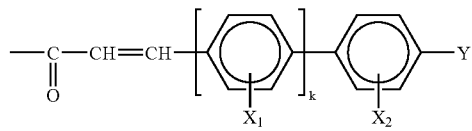

($X_1$ and $X_2$ are each selected from the group consisting of hydrogen, fluorine, chlorine, CN, $NO_2$, $CH_{3-x}F_x$ (x=0~3); k is 0 to 1; Y is selected from the group consisting of hydrogen, fluorine, chlorine, cyano, $NO_2$, $CF_3$, $OCF_3$, $C_nH_{2n+1-x}F_x$, $OC_nH_{2n+1-x}F_x$ (n=1~10, x=0~2n+1), and $R_2$, $R_3$, $R_4$, $R_5$ are selected from the group consisting of hydrogen, fluorine, chlorine, cyano, $NO_2$, $CF_3$, $OCF_3$, $C_nH_{2+1-x}F_x$, $OC_nH_{2n+1-x}F_x$ (n=1~10, x=0~2n+1)).

In addition, the polyethyleneimine is

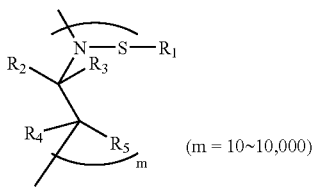

(S (spacer) is $(CH_2)_mO$, $(CH_2)_mN$, $(CH_2)_m$ (m=0~10), $R_1$ is

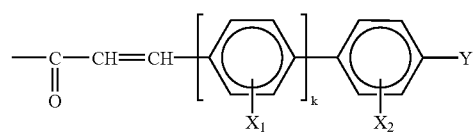

($X_1$ and $X_2$ ($X_1$ and $X_2$ are each selected from the group consisting of hydrogen, fluorine, chlorine, CN, $NO_2$, $CH_{3-x}F_x$ (x=0~3); k is 0 to 1; Y is selected from the group consisting of hydrogen, fluorine, chlorine, cyano, $NO_2$, $CF_3$, $OCF_3$, $C_nH_{2n+1-x}F_x$, $OC_nH_{2n+1-x}F_x$ (n=1~10, x=0~2n+1), and $R_2$, $R_3$, $R_4$, $R_5$ are selected from the group consisting of hydrogen, fluorine, chlorine, cyano, $NO_2$, $CF_3$, $OCF_3$, $C_nH_{2n+1-x}F_x$, $OC_nH_{2n+1-x}F_x$ (n=1~10, x=0~2n+1) ).

The liquid crystal display device of the present invention preferably comprises a second alignment layer on the second substrate. The second alignment layer includes a material selected from the group consisting of a pyranose polymer, a furanose polymer, polyvinyl cinnamate, polysiloxane cinnamate, polyvinyl alcohol, polyamide, polyimide, polyamic acid and silicone dioxide.

The first or second alignment layer is divided into at least two domains for driving liquid crystal molecules in the liquid crystal layer differently on each domain and the first or second alignment layer is divided into at least two portions for aligning liquid crystal molecules in the liquid crystal layer differently in each portion.

The liquid crystal layer includes liquid crystal molecules having positive or negative dielectric anisotropy.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE PREFERRED EMBODIMENTS

Figure 1:
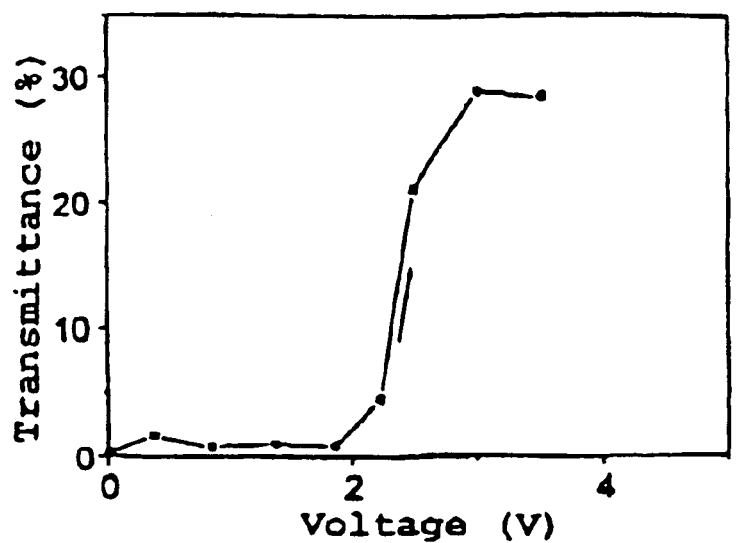
FIG. 1 is a graph of voltage verse transmittance in the homeotropic alignment liquid crystal display device according to an embodiment of the present invention.

Reference will now be made in detail to the preferred embodiments of the present invention.

According to the embodiment of the present invention, in order to enhance the sensitivity of a photo-alignment layer for a liquid crystal device and obtain thermostable anchoring of the liquid crystal, a polyethylene cinnamate (PECN) is used as the photo-alignment material. Several different forms of PECN suitable for use in the present invention are obtained as derivatives of polyethyleneimine and cinnamoyl chloride having various substitution ratios.

A cinnamic acid is first prepared by reacting a benzaldehyde with malonic acid in pyridine and piperidine. The cinnamic acid is then reacted with thionyl chloride to produce a cinnamoyl chloride derivative. The PECN is finally synthesized by reacting PECN with the cinnamoyl chloride derivative in an inert solvent (such as chloroform, nitrobenzene, chlorobenzene, or the like). The reaction mixture is diluted with methanol, filtered, dried in a vacuum, and milled by a vibrating mill, whereupon the PECN is obtained.

The PECN provides a good homogeneous or homeotropic alignment in the liquid crystal alignment, particularly, the homeotropic alignment shows an anisotropy in the azimuthal angle when the voltage is applied thereto.

A process of forming an alignment layer with PECN according to an embodiment of the present invention comprises the following steps.

A glass substrate is spin-coated, dried and heat-treated with the PECN solution to form an alignment layer. The alignment layer is irradiated by a polarized ultraviolet light to induce an anisotropy in the PECN. The glass substrates obtained from the above-described are laminated to face each other, and then the liquid crystal cell is fabricated by injecting the liquid crystal in a nematic or isotropic phase.

Formation of Homeotropic Alignment in Homeotropic Mode Liquid Crystal Display Device 1. Formation of PECN Alignment Layer on Substrate Polyethyleneimine 4-pentoxycinnamate is dissolved in dichloroethane at 50 g/l, the solution is dropped on a glass substrate and followed by spin-coating while centrifuging at a rotation speed of 2000 rpm for 10~30 seconds. A film having a thickness of approximately 0.1 μm is obtained and the produced film is immediately dried at 100° C. for 1 hour to remove the solvent on the substrate.

2. Treatment of Photo-Alignment

The PECN layer on the substrate is irradiated with a polarized ultraviolet light from a Hg-lamp at 250~500W. A linearly polarized light is obtained by having the light pass through a quartz lens and Glan-Thomson prism. The light intensity ($I_0$) of the light is 10 mW/cm$^2$ on the alignment layer.

The light irradiation is Performed twice. The first irradiation is that the UV light is irradiated perpendicularly on the substrate and the polarization direction of the UV light is perpendicular to one side of the substrate. The irradiation time is 5~20 mins. The second irradiation is that the UV light is irradiated in 45 degrees inclination on the substrate and the polarization direction of the UV light is rotated against the polarization direction of the first irradiation UV light. The irradiation time is 10~30 secs.

3. Cell Lamination and LC Injection

The two substrates obtained from the above-stated method are laminated maintaining the cell gap thereof with the spacers of 5~6 μm. A liquid crystal having negative dielectric anisotropy is injected thereto by the capillary pressure at the temperature over $T_{NI}$ (Nematic-Isotropic Phase Transition Temperature: clearing point). Thereafter, the state in the cell becomes an equilibrium state in 10 mins. Accordingly, the liquid crystal cell has an excellent homeotropic alignment and if there is the area not photo-alignment-treated, the homeotropic alignment is observed also in the area.

The PECN layer has an anisotropy on the surface thereof, which could be observed when the voltage is applied thereto. That is, when the electric field is generated, the LC directors are inclined uniformly in a direction opposed the direction of the inclined irradiation, and LC directors are arranged in a direction perpendicular to the polarization direction of the irradiation light by the electric field.

FIG. 1 is a graph of voltage verse transmittance in the homeotropic alignment liquid crystal display device according to an embodiment of the present invention. The LC cell is normally black mode, the directors incline in a direction opposed the inclination direction of the irradiation light when the voltage is applied thereto, and the light transmits according to the directors. The graph of voltage verse transmittance shows that the cell is stable in the alteration of time and temperature.

Therefore, the material of the alignment layer of the present invention provides a uniform alignment, and the incident direction of the UV light determines the inclination direction of the directors. From the above, it could form the multi-domain structure which comprises the regions that the alignment directions thereof are different one another, so that it could fabricate the liquid crystal display device having the characteristics of a high contrast ratio and a wide viewing angle.

Formation of Homogeneous Alignment in Twisted Nematic Mode Liquid Crystal Display Device 1. Formation of PECN alignment layer on substrate Polyethyleneimine 4-fluorocinnamate is dissolved in dichloroethane at 50 g/l, the solution is dropped on a glass substrate and followed by spin-coating while centrifuging at a rotation speed of 2000 rpm for 10~30 seconds. A film having a thickness of approximately 0.1 μm is obtained and the produced film is immediately dried at 100° C. for 1 hour to remove the solvent on the substrate.

2. Treatment of Photo-Alignment

The PECN layer on the substrate is irradiated with a polarized ultraviolet light from a Hg-lamp at 250~500W. A linearly polarized light is obtained by having the light pass through a quartz lens and Glan-Thomson prism. The light intensity ($I_0$) of the light is 10 mW/cm$^2$ on the alignment layer.

The light irradiation is that the UV light is irradiated perpendicularly on the substrate and the polarization direction ($E_{UV}$) of the UV light is perpendicular to one side of the substrate. The irradiation time is 5~15 mins.

3. Cell Lamination and LC Injection

It composes a cell with the substrate obtained from the above-stated method and the other substrate with a polyimide layer rubbing-treated.

The rubbing direction of the polyimide layer and the alignment direction of the surface LC directors thereof are parallel with the long side of the substrate. The pretilt angle ($\theta_{PI}$) of the substrate surface is approximately 1°, which provides a strong anchoring energy to the LC directors.

The above two substrates are laminated maintaining the cell gap thereof with the spacers of 5~6 μm. A liquid crystal having positive dielectric anisotropy (LC ZLI 4801) is injected thereto at the temperature of 90° C., in a isotropic phase.

The PECN layer in the LC cell provides a good homogeneous alignment. If the polarization direction of the incident light is parallel with the long side of the substrate, it could be obtained a good 90° twisted structure. On the other hand, if the polarization direction of the incident light is perpendicular to the long side of the substrate, it shows a homogeneous structure. The above fact represents the alignment axis is perpendicular to the polarization direction of the UV light, and the alignment material provides a strong anchoring energy to the LC.

Figure 2:
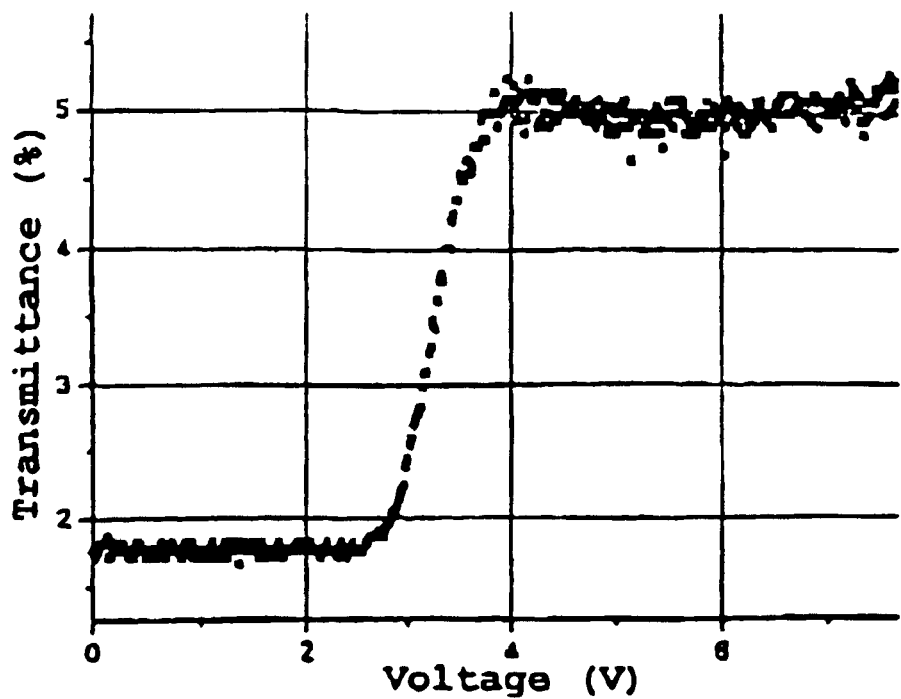
FIG. 2 is a graph of voltage verse transmittance in the homogeneous alignment liquid crystal display device according to an embodiment of the present invention.

FIG. 2 is a graph of voltage verse transmittance in the homogeneous alignment liquid crystal display device according to an embodiment of the present invention and shows that the cell is stable in the alteration of time and temperature.

From the above-described, it proves that the alignment material of the present invention could be applied to all photo-aligning treatment. For example, it could perform the aligning-treatment of the PECN not only two times irradiation with a polarized light but also one time inclined-irradiation with an unpolarized light. In addition, the inclined-irradiation induces the inclined-alignment of the LC, and the alteration of the irradiation time, heat-treatment, parameter of the spin-coating controls the anchoring energy and pretilt angle.

Preferred embodiments of the present invention will now be described in further detail. It should be understood that these examples are intended to be illustrative only and that the present invention is not limited to the conditions, materials or devices recited therein.

EXAMPLE 1

Synthesis of 4-Fluorocinnamic Acid

A mixture of 0.1 mol 4-fluorobenzaldehyde, 0.15 mol malonic acid, and 0.1 ml piperidine in 30 ml pyridine is boiled for 10 hours, cooled, and treated with 150 ml HCl having a 10% concentration. The precipitate is filtered and crystallized with ethanol. The yield of 4-fluorocinnamic acid is 68% and the melting point is 211° C.

The following compounds are synthesized in a similar manner:

2-fluoro cinnamic acid;
3-fluoro cinnamic acid;
3-chloro cinnamic acid;
4-chloro cinnamic acid;
2-methyl cinnamic acid;
4-phenyl cinnamic acid;
4-methoxy cinnamic acid;
4-pentoxy cinnamic acid;
4-heptyloxy cinnamic acid;
4-nonyloxy cinnamic acid;
4-(4-pentoxyphenyl)cinnamic acid;
4-trifluoromethoxy cinnamic acid;
4-trifluoromethyl cinnamic acid;
4-pentyl cinnamic acid; and
4-methoxy-3-fluorocinnamic acid.

EXAMPLE 2

Synthesis of Polyethyleneimine Cinnamate

A mixture of 0.05 mol cinnamoyl chloride (prepared from a cinnamic acid produced in Example 1, an excess of thionyl chloride, and catalytic quantities of dimethyl formamide), 0.04 mol polyethyleneimine, and 0.06 mol pyridine in 40 ml chloroform is heated for 24 hours at 20° C., cooled, and diluted with methanol. The reaction product is filtered, washed with methanol and water, dried in a vacuum, and subsequently milled by a vibrating mill. The yield of cellulose cinnamate is approximately 60% to 90%. Thin layer chromatography (TLC) reveals there is no cinnamic acid in the reaction products.

EXAMPLE 3

Synthesis of Hydroxyethylated Polyethyleneimine Cinnamate

A mixture of 0.05 mol cinnamoyl chloride (prepared from a cinnamic acid produced in Example 1, an excess of thionyl chloride, and catalytic quantities of dimethyl formamide), 0.01 mol hydroxyethylated polyethyleneimine, and 0.06 mol pyridine in 20 ml nitrobenzene is heated for 24 hours at 80° C., cooled, and diluted with methanol. The reaction product is filtered, washed with methanol and water, dried in a vacuum, and subsequently milled by a vibrating mill. The yield of cellulose cinnamate is approximately 60% to 90%. Thin layer chromatography (TLC) reveals there is no cinnamic acid in the reaction products.

The mechanism of the synthesis according to an embodiment of the present invention is as follows:

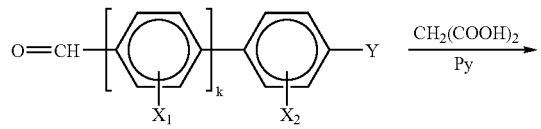

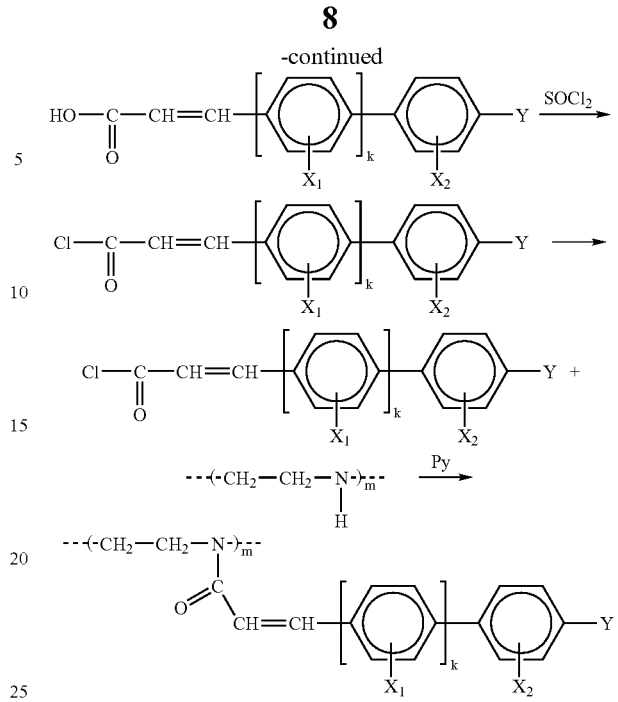

$m=10\sim10,000$ $X_1$ and $X_2$ are each selected from the group consisting of hydrogen, fluorine, chlorine, $CH_3$, $OCH_3$ $k=0\sim1$ Y is hydrogen, fluorine, chlorine, CN, $CF_3$, $OCF_3$, $C_nH_{2n+1}$, $OC_nH_{2n+1}$ (n=1~10)

In addition, cinnamoyl derivatives includes hydrogen, fluorine, chlorine, CN, $NO_2$, $CH_3$, $OCH_3$, $CF_3$, $OCF_3$, $C_nH_{2n+1-x}F_x$ (n=1~10, x=0~2n+1), $OC_nH_{2n+1-x}F_x$ (n=1~10, x=0~2n+1), $C_6H_{5-x}F_x$ (n=1~10, x=0~5), $C_6H_4OC_nH_{2n+1-x}F_x$ (n=1~10, x=0~2n+1).

Besides, it is possible that the polyethyleneimine is

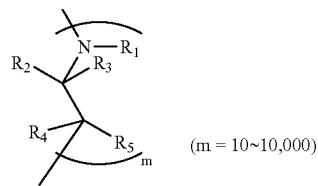

($R_1$ is

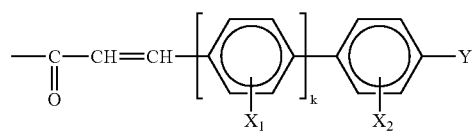

($X_1$ and $X_2$ are each selected from the group consisting of hydrogen, fluorine, chlorine, CN, $NO_2$, $CH_{3-x}F_x$ (x=0~3); k is 0 to 1; Y is selected from the group consisting of hydrogen, fluorine, chlorine, cyano, $NO_2$, $CF_3$, $OCF_3$, $C_nH_{2n+1-x}F_x$, $OC_nH_{2n+1-x}F_x$ (n=1~10, x=0~2n+1), and $R_2$, $R_3$, $R_4$, $R_5$ are selected from the group consisting of hydrogen, fluorine, chlorine, cyano, $NO_2$, $CF_3$, $OCF_3$, $C_nH_{2n+1-x}F_x$, $OC_nH_{2n+1-x}F_x$ (n=1~10, x=0~2n+1)).

A spacer is included between the polyethyleneimine and photo-sensitive constituent and is selected from the group consisting of $(CH_2)_mO$, $(CH_2)_mN$, $(CH_2)_m$ (m=0~10).

The liquid crystal display device of the present invention comprises first and second substrates, respectively, a thin film transistor (TFT) on the first substrate, a first alignment layer formed entirely over the TFT and the first substrate, a second alignment layer formed on the second substrate, and a liquid crystal layer injected between first and second substrates.

When UV light is irradiated onto the first and/or second alignment layers at least once, the alignment direction and the pretilt angle are determined and alignment stability of the liquid crystal is achieved.

As the light used in the photo-alignment method, light in the UV range is preferable. It is not advantageous to use unpolarized light, linearly polarized light, or partially polarized light.

Moreover, it is contemplated as within the scope of the present invention that only one substrate of the first and second substrates be photo-aligned using the above-described method while the other substrate is not so treated. If both substrates are photo-aligned, it is within the scope of the invention that the other substrate be treated with polyamide or polyimide as the alignment material and that the alignment be accomplished by rubbing methods. It is also possible to use a photo-sensitive material such as polyvinyl cinnamate (PVCN) or polysiloxane cinnamate (PSCN) as the alignment material for the other substrate and accomplish the alignment using photo-alignment methods.

As to the nature of liquid crystal layer, it is possible to align the long axes of the liquid crystal molecules parallel with the first and second substrates to produce a homogeneous alignment. It is also possible to align the long axes of the liquid crystal molecules perpendicular to the first and second substrates to achieve a homeotropic alignment. Moreover, it is possible to align the long axes of the liquid crystal molecules with a specific predetermined angle in relation to the substrates, with a tilted alignment in relation to the substrates, with a twisted alignment in relation to the substrates, or in an alignment parallel to one substrate and perpendicular to the other substrate to provide a hybrid (homogeneous-homeotropic) alignment. It is thus essentially within the scope of the present invention to apply any mode of alignment of the liquid crystal molecules in relation to the substrates as may be desired, such choices being apparent to one of ordinary skill in the art.

According to the present invention, the first and/or second alignment layers can be divided into two or more domains by creating different directional alignments of the liquid crystal molecules on each domain in relation to the direction of the substrates. Accordingly, a multi-domain LCD such as a two-domain LCD, a four-domain LCD, and so on can be obtained, wherein the liquid crystal molecules in each domain are driven differently.

A LCD made in accordance with the present invention is characterized by excellent thermostability. Further, the photo-alignment layer of the present invention has excellent photosensitivity, photo-aligning capability, adhesion, and strong anchoring energy. Therefore, it is possible to align the liquid crystal effectively and increase alignment stability of the liquid crystal. Furthermore, it could apply effectively to various modes such as homogeneous or homoetropic alignment, or the like, so that it is easy to form the multi-domain. Especially, in case of the PECN including a spacer between the main chain and the photo-sensitive constituent, it is easy to control the pretilt, so that it shows a good aligning capability in the tilted and homogeneous alignment.

It will be apparent to those skilled in the art that various modifications and variations can be made in the liquid crystal display device of the present Invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device, comprising:
    providing first and second substrates;
    forming a first alignment layer on the first substrate, wherein the first alignment layer includes polyethyleneimine, wherein the first alignment layer includes at least one photo-sensitive constituent; and
    providing a layer of liquid crystal material between the first and second substrates.
    wherein the at least one photo-sensitive constituent includes cinnamoyl derivatives.

2. The method of fabricating a liquid crystal display device according to claim 1, wherein the polyethyleneimine is within a main chain of the first alignment layer.

3. The method of fabricating a liquid crystal display device according to claim 1, further comprising providing a spacer between the polyethyleneimine and the at least one photo-sensitive constituent.

4. The method of fabricating a liquid crystal display device according to claim 3, wherein the spacer is a material selected from the group consisting of $(CH_2)_mO$, $(CH_2)_mN$, and $(CH_2)_m$, where m=0~10.

5. The method of fabricating a liquid crystal display device according to claim 1, wherein the at least one photo-sensitive constituent includes cinnamoyl derivatives.

6. The method of fabricating a liquid crystal display device according to claim 5, wherein the cinnamoyl derivatives include at least one member selected from the group consisting of hydrogen, fluorine, chlorine, cyano, $NO_2$, $CH_3$, $OCH_3$, $CF_3$, $OCF_3$, $C_nH_{2n+1-x}F_x$, $OC_nH_{2n+1-x}F_x$ (n=1~10, x=0~2n+1), $C_6H_{5-x}F_x$ (n=1~10, x=0~5), and $C_6H_4OC_nH_{2n+1-x}F_x$, where n=1~10 and x=0~2n+1.

7. The method of fabricating a liquid crystal display device according to claim 1, wherein the forming of the first alignment layer includes:
    spin coating the first substrate with a solution; and
    drying the spin-coated solution to form a film.

8. The method of fabricating a liquid crystal display device according to claim 7, wherein the film is about 0.1 μm thickness.

9. The method of fabricating a liquid crystal display device according to claim 7, wherein the drying includes heating the spin-coated solution.

10. The method of fabricating a liquid crystal display device according to claim 9, wherein the heating includes heating the spin-coated solution to a temperature of 100° C.

11. The method of fabricating a liquid crystal display device according to claim 9, wherein the heating includes heating the spin-coated solution for one hour.

12. The method of fabricating a liquid crystal display device according to claim 7, wherein the forming of the first alignment layer further includes performing a first irradiation wherein light is irradiated to the film.

13. The method of fabricating a liquid crystal display device according to claim 12, wherein the light irradiated during the first irradiation is polarized light.

14. The method of fabricating a liquid crystal display device according to claim 12, wherein the light irradiated during the first irradiation is unpolarized light.

15. The method of fabricating a liquid crystal display device according to claim 12, wherein the light irradiated during the first irradiation is ultraviolet light.

16. The method of fabricating a liquid crystal display device according to claim 12, wherein the light irradiated during the first irradiation is irradiated perpendicularly to the surface of the first substrate.

17. The method of fabricating a liquid crystal display device according to claim 12, wherein a polarization direction of the light irradiated during the irradiation is substantially perpendicular to one side of the first substrate.

18. The method of fabricating a liquid crystal display device according to claim 12, wherein the light irradiated during the first irradiation has an intensity of 10 mW/cm$^2$ on the film.

19. The method of fabricating a liquid crystal display device according to claim 12, wherein the light irradiated during the first irradiation is irradiated for a duration of 5–20 minutes.

20. The method of fabricating a liquid crystal display device according to claim 12, further comprising, after performing the first irradiation, performing a second irradiation, wherein light is irradiated onto the irradiated film.

21. The method of fabricating a liquid crystal display device according to claim 20, wherein the light irradiated during the second irradiation polarized light.

22. The method of fabricating a liquid crystal display device according to claim 20, wherein the light irradiated during the second irradiation is ultraviolet light.

23. The method of fabricating a liquid crystal display device according to claim 20, wherein the light irradiated during the second irradiation is irradiated obliquely to the surface of the first substrate.

24. The method of fabricating a liquid crystal display device according to claim 23, wherein the light irradiated during the second irradiation is irradiate at an angle of 45° with respect to the surface of the first substrate.

25. The method of fabricating a liquid crystal display device according to claim 20, wherein a polarization direction of the light irradiated during the second irradiation is rotated with respect to the polarization direction of the light irradiated during the first irradiation.

26. The method of fabricating a liquid crystal display device according to claim 20, wherein the light irradiated during the second irradiation is irradiated for a duration of 10–30 seconds.

27. The method of fabricating a liquid crystal display device according to claim 1, further comprising dividing the first alignment layer into at least two domains, wherein alignment directions in each domain are different.

28. The method of fabricating a liquid crystal display device according to claim 1, further comprising forming a second alignment layer on the second substrate.

29. The method of fabricating a liquid crystal display device according to claim 28, further including dividing the second alignment layer into at least domains, wherein alignment directions in each domain are different.

30. The method of fabricating a liquid crystal display device according to claim 28, wherein the second alignment layer is formed of substantially the same material as the first alignment layer.

31. The method of fabricating a liquid crystal display device according to claim 28, wherein the second alignment layer includes a material selected from the group consisting of a pyranose polymer, a furanose polymer, polyvinyl cinnamate, polysiloxane cinnamate, polyvinyl alcohol, polyamide, polyimide, polyamnic acid, and silicone dioxide.

32. The method of fabricating a liquid crystal display device according to claim 28, wherein the second alignment layer is photo-sensitive.

33. The method of fabricating a liquid crystal display device according to claim 32, wherein the second alignment layer is one of polyvinyl cinnamate (PVZN) and polysiloxane cinnamate (PSCN).

34. The method of fabricating a liquid crystal display device according to claim 28, wherein alignment in the second alignment layer is accomplished by rubbing methods.

35. The method of fabricating a liquid crystal display device according to claim 1, further comprising aligning liquid crystal molecules within the layer of liquid crystal material homogeneously to the surfaces of the first and second substrates.

36. The method of fabricating a liquid crystal display device according to claim 1, further comprising aligning liquid crystal molecules within the layer of liquid crystal material homeotropically to the surfaces of the first and second substrates.

37. The method of fabricating a liquid crystal display device according to claim 1, further comprising aligning liquid crystal molecules within the layer of liquid crystal material homogeneously to the surface of one of the first and second substrates and homeotropically to the surface of the other of the first and second substrates.

38. A method of fabricating a liquid crystal display device, comprising:
    providing a substrate;
    forming a photo-alignment layer on the substrate, wherein forming the photo-alignment layer comprises providing polyethylene cinnamate; and
    providing a liquid crystal material on the photo-alignment layer.

39. The method according to claim 38, wherein the forming of the photo-alignment layer includes reacting derivatives of polyethyleneimine and cinnamoyl chloride.

40. The method according to claim 38, wherein the forming of the photo-alignment layer includes reacting cinnamic acid with thionyl chloride.

* * * * *